United States Patent
Yu et al.

(10) Patent No.: US 8,031,731 B2
(45) Date of Patent: *Oct. 4, 2011

(54) SYSTEM FOR SHARING A NETWORK PORT OF A NETWORK INTERFACE INCLUDING A LINK FOR CONNECTION TO ANOTHER SHARED NETWORK INTERFACE

(75) Inventors: James J. Yu, San Jose, CA (US); Andrew C. Yang, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 12/135,368

(22) Filed: Jun. 9, 2008

(65) Prior Publication Data

US 2009/0304002 A1 Dec. 10, 2009

(51) Int. Cl.
*H04L 12/66* (2006.01)

(52) U.S. Cl. ......................................... 370/419; 370/463

(58) Field of Classification Search .................. 370/389, 370/392, 400, 401, 419, 420, 463; 709/220, 709/226, 249, 250
See application file for complete search history.

(56) References Cited

U.S. PATENT DOCUMENTS

| | | | | |
|---|---|---|---|---|
| 7,738,457 B2* | 6/2010 | Nordmark et al. | ............ | 370/392 |
| 7,792,140 B2* | 9/2010 | Droux et al. | .................. | 370/463 |
| 7,869,439 B1* | 1/2011 | Ramberg et al. | ......... | 370/395.54 |
| 7,872,965 B2* | 1/2011 | Enstone et al. | ................ | 370/217 |
| 2003/0130832 A1* | 7/2003 | Schulter et al. | ................. | 703/23 |
| 2005/0053060 A1 | 3/2005 | Pettey | | |
| 2007/0067462 A1* | 3/2007 | Takeda | .......................... | 709/227 |
| 2008/0240142 A1* | 10/2008 | Belgaied et al. | .............. | 370/420 |
| 2011/0035494 A1* | 2/2011 | Pandey et al. | ................. | 709/224 |

OTHER PUBLICATIONS

U.S. Appl. No. 12/135,348, filed Jun. 9, 2008 Entitled: "Shared Virtual Network Interface" First Named Inventor: Andrew C Yang.

* cited by examiner

*Primary Examiner* — Hassan Phillips
*Assistant Examiner* — Duc Duong
(74) *Attorney, Agent, or Firm* — Meyertons, Hood, Kivlin, Kowert & Goetzel, P.C.; Stephen J. Curran

(57) ABSTRACT

A system for sharing a network port of a network interface includes a plurality of processing units, a first network interface unit coupled to a first portion of the plurality of processing units, a second network interface unit coupled to a different portion of the plurality of processing units, and a link coupled between the first and second network interface units. The first and second network interface units each includes an independently controllable network port for connection to a network, and a virtual interface. The network port includes a shared MAC unit, a link interface, and control logic, which may selectably route packets between processing units of the first portion of the plurality of processing units and the network via the link and the network port of the second network interface unit. The virtual interface may include a plurality of independent programmable virtual MAC units.

20 Claims, 9 Drawing Sheets

SYSTEM FOR SHARING A NETWORK PORT OF A NETWORK INTERFACE INCLUDING A LINK FOR CONNECTION TO ANOTHER SHARED NETWORK INTERFACE

BACKGROUND OF THE INVENTION

1. Field of the Invention

This invention relates to networking systems and, more particularly, to shared network resources.

2. Description of the Related Art

Networked computer systems are typically connected to a network using some type of network interface. The type of interface varies depending on the network protocol. For example, in an Ethernet network, a computer system or processing node may connect to the network using a network interface card (NIC). The NIC may be assigned a unique medium access control (MAC) address that identifies that NIC to all the other computer systems in the world, that may be connected to the network. In a conventional system, each processing node may have its own NIC, and thus its own network port.

In computer systems that include a large number of processing nodes such as, for example, server systems that have a large number of blade processing units in each chassis, the component count of the resources used to access the network can get quite large. Accordingly, the costs associated the networking components may also be high, especially for some of the newer standards such as 10Gigabit Ethernet, for example. This may be especially true since each of the processing units may typically only use a fraction of the bandwidth that a 10GE link can provide. Additional drawbacks associated with large networked systems include the large amount of rack space that must be dedicated to cabling, network port connectors, and the like, and the mechanical issues and mean time between failure (MTBF) for these components.

SUMMARY

Various embodiments of a system for sharing a network port of a network interface including a link for connection to another network interface are disclosed. In one embodiment, the system includes a plurality of processing units, a first network interface unit coupled to a first portion of the plurality of processing units, a second network interface unit coupled to a different portion of the plurality of processing units, and a link coupled between the first network interface unit and the second network interface unit. Each of the first network interface unit and the second network interface unit includes an independently controllable network port for connection to a network, and a virtual interface that is coupled to the network port. The network port includes a shared media access control (MAC) unit, a link interface, and control logic. The link interface may be configured to convey packets to the link. The control logic may selectably route packets between processing units belonging to the first portion of the plurality of processing units and the network via the link and the network port of the second network interface unit. The virtual interface may be configured as a virtual segment and includes a plurality of independent programmable virtual MAC units. Each virtual MAC unit may be associated with a respective processing unit, and programmably configured by the respective processing unit.

Figure 1:
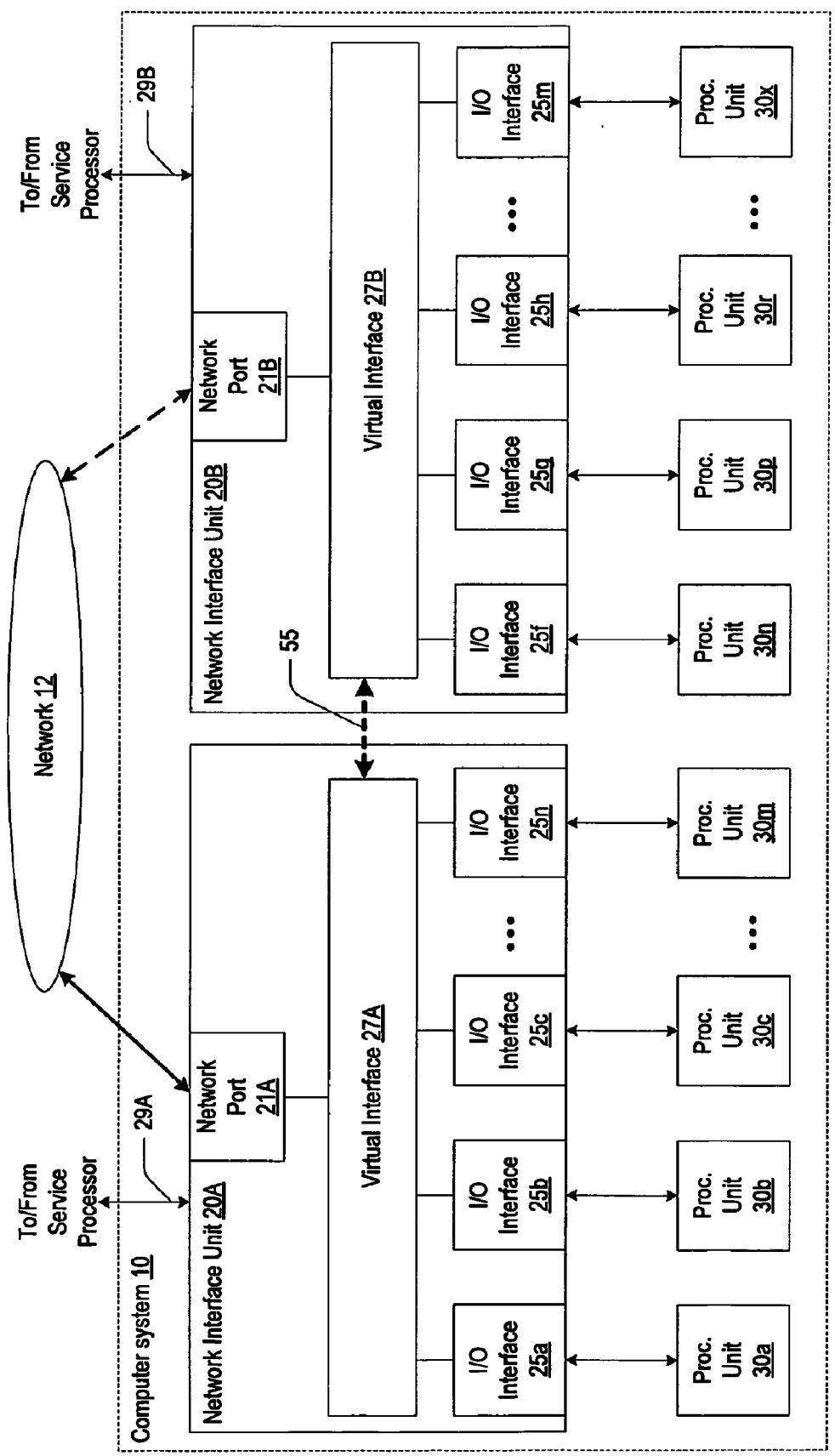
FIG. 1 is a block diagram of one embodiment of a computer system connected to a network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system connected to a network is shown. Computer system 10 includes a plurality of processing units designated 30a-30m, and 30n-30x, where m and x may be representative of any number. As shown, each of the processing units 30a-30m is coupled to a network interface unit 20A, and each of the processing units 30n-30x is coupled to a network interface unit 20B. In various embodiments, both the network interface units 20A and 20B may be coupled to a network 12. However, depending upon the system configuration either one of the network interface units 20A and 20B may be optionally coupled to the network 12. As shown in the embodiment in FIG. 1, network interface unit 20A is coupled to the network 12, and network interface unit 20B is not, as depicted by the dotted line. Instead, the network interface 20B may optionally use the interface link 55 to communicate with the network 12 and with the network interface unit 20A. Thus, as described in greater detail below, in various embodiments, computer system 10 may be configured such that each network interface unit may be operated independently of each other, or in cooperation with each other through the use of the inter link 55. It is noted that components having reference designators with a number and letter may be referenced by just the number where appropriate.

In one embodiment, each of the processing units 30 may be representative of a processing node such as a blade server, for example, each of which may include one or more processors or CPUs. As such, the computer system 10 may be representative of part of a blade chassis. However, it is contemplated that in other embodiments, any type of processing node may be used.

As shown in FIG. 1, each network interface unit 20 includes a network port 21, a virtual interface 27, and a plurality of input/output (I/O) interfaces 25. The network port 21 may provide a connection to the network 12 using a network protocol. In one embodiment, the network 12 may be any of a variety of frame-based protocols such as the Ethernet protocol. As such, the network connection may be a 10-Gigabit Ethernet (10GE) connection. Accordingly, as will be described in greater detail below, network port 21 may be configured to provide a cable or optical interface, as well as other network functions such as medium access control (MAC) functions, physical (PHY) layer functions, and physical coding sublayer (PCS) functionality. In one embodiment, the I/O interfaces 25 may be representative of peripheral component interconnect (PCI) express (PCIe) compliant interfaces. Thus, each I/O interface 25 includes independently configurable configuration space.

The virtual interface 27 may provide sharing of the network port 21 among the plurality of processing units 30. More particularly, the virtual interface 27 may provide a shared set of resources (e.g., MAC, statistics and control, DMA) that allow each processing unit 30 to substantially transparently share the network port 21. In other words, when combined with the independent I/O interfaces 25, it appears to each of the processing units 30 that each one is connected to separate and independent network interface card (NIC), thereby creating a virtual NIC for each processing unit 30.

The virtual interface 27, creates a virtual Ethernet segment, thus removing the need for a network switch to handle communications between the processing units 30 and the network 12. Accordingly, as an Ethernet segment, each packet transmitted to the network 12 is seen by both the external network 12 and the internal virtual NIC for each processing unit 30 (except the sending processing unit). As described further below, when two network interface units are connected together via the link 55 and configured to operate in a cooperative arrangement to share a network port 21, the virtual segment may be extended, thereby allowing more processing units to exist within a virtual segment.

The virtual interface 27 may also provide for both a shared domain that may be configurable by a maintenance or "service" processor (not shown) via a maintenance bus 29, and a number of separate processing unit or "blade" domains that may be configured and controlled by each processing unit 30 independently. In one embodiment, the shared domain may forward device errors and status to the blade domain through hardware. One such status is the link status, which may indicate to the blade domain if the network port 21 link is functioning properly. The link status may include the status of any external 10GE support, the link layer status of the internal network interface unit 20, and the functional status of the shared domain. A failure in any of these may cause the link status to be bad, and the blade domain should react accordingly. In one embodiment, a blade domain may be interrupted upon any change in link status. In another embodiment, a software mailbox mechanism may be used for diagnostic purposes to provide low-speed communication between the service processor and the processing units 30.

In various embodiments, both the network interface units 20A and 20B may reside in the same chassis, and depending on the configuration of the system, a number of processing units 30 (blade servers) may be connected to the network 12 using either one or two network ports 21. In one embodiment, each network interface 20 may operate independently from the other as each network interface unit 20 may be coupled to the network 12 using its own network port 21. Alternatively, as described further below, in other embodiments, one of the network ports 21 may be disabled, and the interface link 55 may be used to interconnect two interface units together in a master/slave arrangement such that both network interface units share one network port 21. In addition, it is noted that both of these arrangements provide an opportunity to implement failover mechanisms.

Figure 2:
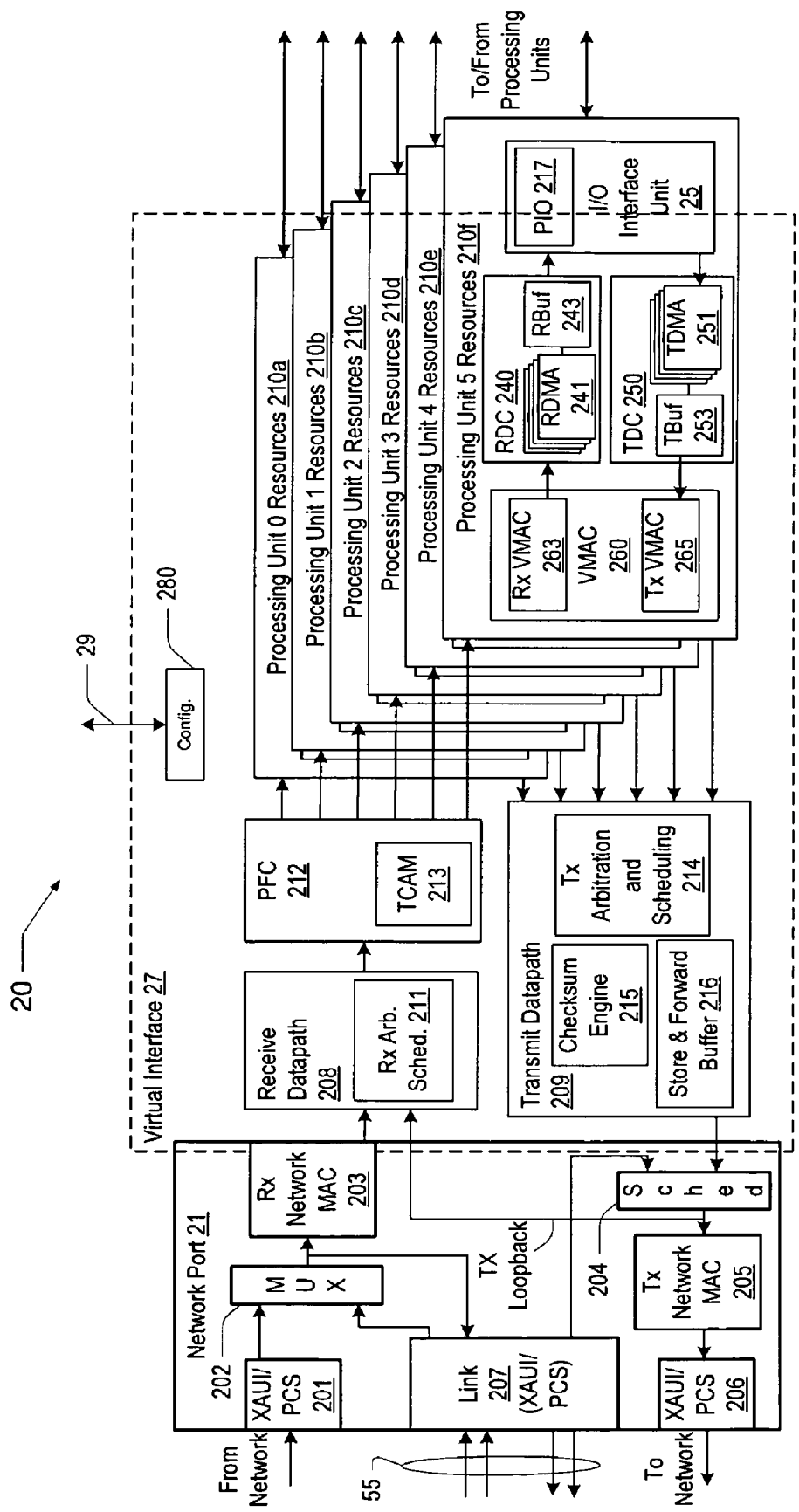
FIG. 2 is a block diagram illustrating more detailed aspects of an embodiment of the network interface unit of FIG. 1

Referring to FIG. 2, a block diagram illustrating more detailed aspects of an embodiment of a network interface unit 20 of FIG. 1 is shown. Network interface 20 includes a network port 21, and a virtual interface 27, which may include a number of I/O interface units 25 that each provide an I/O interconnect to a respective processing unit 30.

In the illustrated embodiment, the network port 21 includes a network MAC that includes a transmit network MAC 205 and a receive network MAC 203. The network MAC may be configured to provide a number of features including full duplex operation at 10 Gbps, independent enable and disable or transmit and receive functions, detection of packet length errors, RMON statistics and error counters, cyclic redundancy code (CRC) calculation and error detection, programmable filtering of packets (including MAC and virtual local area network (VLAN)), padding of transmitted packets, and IEEE 802.3x flow control. In one embodiment, the features of the network MACs 203 and 205 may be programmed or otherwise configured by the service processor. The Rx network MAC 203 may be placed in promiscuous mode so that all Rx traffic is seen by each virtual MAC (VMAC) 260 (described further below), as a network hub would do. For Tx traffic, the Tx network MAC 205 may not generate CRC or add padding to any packet. Instead, the Tx VMAC 265 may be configured to generate all the bits for the frame such that the Tx network MAC 205 only has to transmit them to the port. However, the Tx network MAC 205 may support Pause in the Rx direction, which may allow an external switch to throttle the processing units 30. In one implementation, it may not be desirable for the network interface unit 20 to pause the external switch, since doing so may create congestion in the network. Any received Rx pause frames may be forwarded to all the VMACs 260. In addition, the RMON statistics gathered by the network MACs 203 and 205 are the aggregate for the 10GE link. Once read, the counters may automatically reset and begin counting from zero.

As shown, the network port 21 also includes attachment unit interfaces (XAUI) 201 and 206 for connecting to the external network. In one embodiment, the XAUI 201 and 206 may be 10GE-compliant and include four lanes, each including an integrated serializer/deserializer (SerDes) (not shown) that may operate at 3.125 Gbps. The four lanes may be bonded together into a single logical interface link to form the XAUI port. The XAUI 201 and 206 ports may be configured to communicate directly with an optical transceiver (not shown). Each of the XAUI 201 and 206 ports may also include independently controllable PCS functionality. It is contemplated that in other embodiments, other types of interfaces to the network such as a 10 Gigabit media independent interface (XGMII), for example, may be used. In FIG. 2, the network port 21 also includes link unit 207 which may include both XAUI and PCS functionality. In one embodiment, the link unit 207 may include four such XAUI/PCS units (two transmit and two receive), one for each of the link connections 55.

The network port 21 also includes a receive mux 201 that is coupled to select one of the Link 207 inputs (which represents link 55 traffic from another network interface 20) or the XAUI input (i.e., network traffic from the network port) as the input to the Rx MAC 203. As will be described further below, the maintenance or service processor may configure the receive mux 202 as part of the configuration process of the network interface unit 20 using configuration registers 280.

In addition, the network port 21 includes a Tx scheduler 204. In one embodiment, Tx scheduler 204 may be configured to arbitrate between packets from the transmit datapath 209 and packets received through the link 55, when enabled, using a deficit round robin arbitration scheme. In one embodiment, Tx scheduler 204 may have a programmable arbitration weighting. The weighting may be programmed by the service processor, taking into account the number of processing units in the system. Thus traffic from a link-connected network interface unit 20 may receive fair access to the network 12.

In the illustrated embodiment, the virtual interface 27 includes a transmit datapath 209, a receive datapath 208, packet filtering and classification (PFC) unit 205, and six processing unit resources designated 207a through 207f, each of which may be connected to a respective processing unit such as processing unit 30 of FIG. 1. For example, processing unit resource 207a may be connected to processing unit 30a, processing unit resource 207b may be connected to processing unit 30b, and so forth. It is noted however, in other embodiments, there may be any number of processing unit resources.

In one embodiment, the transmit datapath 209 includes a transmit arbitration and scheduling unit 214 that may be configured to act as a fair multiplexer for packets sent by the processing units. Transmit arbitration and scheduling unit 214 may be configured to arbitrate between the re-order buffers of each processing unit resource for packet transmission using a deficit round robin arbitration scheme using a transmitted byte count. The weighting of all of the processing units 30 may be equal. For example, in the case of a fully loaded system, each processing unit 30 should receive no more than 17% of the bandwidth. However, if any of the processing units 30 are idle on transmit, the active processing units 30 may use the excess bandwidth to saturate the line.

In addition, the arbitration and scheduling unit 214 may be configured to schedule full packets from each Tx reorder buffer (e.g., TBuf 253). Further, the transmit datapath 209 may include checksum offload engine 215 that may perform a UDP/TCP checksum offload for all processing units. The transmit datapath 209 may also include a Tx Store & Forward Buffer 216 that may work in conjunction with the Checksum Offload engine 215 so that a checksum for an entire packet can be placed in a packet header.

In one embodiment, the receive datapath 208 may be configured to frame packets along cycle boundaries. In addition, the receive datapath 208 includes a receive arbitration and scheduling unit 211 that may be configured to arbitrate between packets received from the network and packets received from the Tx loopback path.

In one embodiment, the PFC unit 212 may be configured to filter incoming packets based on MAC address and/or virtual LAN (VLAN) membership. If the filtering process identifies a single processing unit 30, a ternary content addressable memory (TCAM) 213 may be used to perform a TCAM classification based on, for example, L2/L3/L4 to identify a specific Rx DMA channel for the identified processing unit 30. As will be described in greater detail below, the PFC unit 212 may incorporate the filtering function of each VMAC unit. Accordingly, the PFC unit 212 may be individually configured by each processing unit 30, so that each processing unit 30 may control its own filtering options.

As shown, each processing unit resource 210 includes a respective one of the I/O interface units 25, each of which includes an independently configurable programmed I/O unit designated PIO 217. In addition, each processing unit resource 210 includes a VMAC 260, and receive and transmit DMA controllers, designated RDC 240 and TDC 250, respectively.

As described above, in one embodiment, the I/O interface unit 25 may be representative of a PCIe interface. Accordingly, each I/O interface unit 25 is an independent PCIe endpoint. Thus, in one implementation, the network interface unit 20 has six PCIe x8 ports, (i.e. each port includes 8 lanes). Each port may be configured as a PCIe endpoint that provides 16 Gbps of full duplex raw bandwidth to the PCIe hierarchy of a processing unit 30. In addition, each I/O interface may also include an integrated SerDes per lane, each of which may run at 2.5 Gbps. Thus the eight lanes may be bonded together into a single logical interface link that runs at 16 Gbps. The PIO unit 217 includes configuration and status registers, and supports memory mapped I/O posted and non-posted transactions, and as described above each I/O interface unit 25 may be connected to a single respective processing unit such as processing unit 30a of FIG. 1, for example. Each I/O interface 25 may be programmed and controlled by the processing unit 30 to which it is connected. It is noted that in other implementations, other lane and link speeds may be used. For example, the lanes may each operate at 5 Gbps, for a total of 32 Gbps of full duplex user bandwidth to the PCIe hierarchy.

The virtual MAC functionality for each processing unit resource 210 may be physically separated into 3 distinct areas: Tx VMAC, Rx VMAC, and packet filtering and classification. Accordingly, in the illustrated embodiment, the VMAC 260 includes both a transmit VMAC 265 and a receive VMAC 263. As described above, the PFC unit 212 may incorporate the filtering function of each VMAC. Unlike the network MAC, each VMAC 260 has more configurability. More particularly, each VMAC 260 may be configured by the processing unit 30 to which the respective processing unit resource 210 is connected. For example, in one embodiment, a given processing unit 30 may configure such functions as TxEnable, TxPadding, TxCRC, RxEnable, Promiscuous, PromiscuousGroup, ErrorCheckDisable, RxCRCChkDisable, ReservedMulticast, RxCodeCheckDisable, HashFilterEn, AddrFilterEn, StripCRC, ReceivePauseEnable, and PassFlowControlFrame. In this way, the processing units 30 are truly independent of one another by having control of how packets are received and transmitted (e.g. strip out CRC). Also unlike the network MAC (e.g., Tx network MAC 205 and Rx network MAC 203), the VMAC 260 allows each processing unit 30 to access full statistics on packets, similar to what a physical NIC/MAC per processing unit would provide in a conventional system.

As described above, the network interface unit 20 may only support Rx flow control coming from the network switch. More particularly, in one embodiment, when an incoming pause frame is seen, the Rx network MAC 203 may cause the Transmit function to be throttled, which in turn may throttle back the Tx VMAC 265, if enabled for pause frames. The incoming pause frame can also be forwarded all the way to a processing unit 30 to throttle software. It is noted that typically, the network interface unit 20 may not generate an outgoing pause frame on its own. In one embodiment, software can generate such a frame. Outgoing pause frames that loop back can cause a VMAC to throttle (if enabled), and/or forward to processing units 30 for throttling by software.

The network interface unit 20 uses multiple DMA channels to transfer data to and from a processing unit's main memory.

DMA allows the processing units' CPUs to perform other tasks while the network interface unit 20 transfers the packets for Tx and Rx. The DMA channels are serviced independently so that multiple processing units' CPUs may access their own DMA channels concurrently. In one specific implementation, the network interface unit 20 supports a total of 24 Rx and 24 Tx DMA channels. In one embodiment, the DMA channels are divided evenly among the processing units, with each processing unit 30 having four dedicated Rx DMA channels and four dedicated Tx DMA channels. This allows for greater concurrency among the processing units. DMA scheduling may be performed on packet boundaries.

Accordingly, in the illustrated embodiment, the receive DMA controller (RDC) 240 includes a plurality of receive DMA (RDMA) contexts or channels 241 which are coupled to a receive first-in-first-out (FIFO) buffer (RBuf) 243. Similarly, the transmit DMA controller (TDC) 250 includes plurality of transmit DMA (TDMA) contexts or channels 251 which are coupled to a transmit reorder buffer (TBuf) 253. As discussed above, there may be four transmit and four receive channels. In one implementation, each RDMA channel 241 may include ring buffers and control logic (not shown) that may function to push packets into memory. In addition, the RDC 240 may be programmed to send to a given processing unit notifications such as timeouts, and packet number threshold crossings, for example, to prevent packets from sitting too long.

As shown, the four TDMA channels 251 associated with a PCIe port share TBuf 253. The TDMA channels 251 may support transmit gather for up to fifteen separate buffers. In one implementation, each TDMA channel 251 may include a Tx descriptor ring and a descriptor cache (not shown) that may be shared among the four channels. The descriptor ring may function as a gather list of the buffers, and may hold pointers to packets for transmission. Rather than adding packets one at a time, software may use kick registers (not shown) to add multiple packets. A kick register is used by software to add buffers to the ring and to inform the network interface unit 20 that packets are available for the DMA channel 251 to retrieve from memory. The descriptor cache may allow for up to two cache lines worth of Tx descriptors to be stored for each DMA channel. The Tx descriptors may be cached and presented to the Tx datapath 209. In one implementation, each descriptor may be 8 bytes and 128 bytes worth of descriptors may be cached in a logical FIFO per DMA channel. Additional descriptors may be requested under certain conditions. For example, if the descriptor cache is empty, or the descriptor cache has data, but has enough space for an additional cache line worth of descriptors, additional descriptors may be requested.

Control logic within the Tx datapath 209 may request descriptors from the DMA channel and then request the packets from main memory. Multiple outstanding transactions may be supported to absorb the request latency over PCIe and to keep data flowing constantly. Packet data are sent to TBuf 253 to preserve ordering of packets within a DMA channel because PCIe read completions may arrive out of order for different transaction IDs.

In one embodiment, TDC 250 may support multiple outstanding requests in order to compensate for the latency of requests across PCIe by keeping the TBuf 253 as full as possible. For example, TDC 250 may check for space in the TBuf 253, allocate space to the next packet requested, and then send the request to the PCIe interface. The TDC 250 uses TBuf 253 to guarantee packet ordering within a DMA channel. More particularly, in the PCIe protocol, the ordering of completions between different requests is not guaranteed, while completions for the same request ID are guaranteed to arrive in address order. When the TDC 250 checks for space in the TBuf 253, it allocates the space and associates the space with a specific PCIe transaction ID to put the packet completions in the correct location, and packets are only requested when there is space for the packet in the TBuf 253. Packet transmission is considered completed when the entire packet has been transmitted from the TBuf 253. DMA status registers (not shown) may be updated when packet transmission is complete. In addition, software may mark a packet to trigger an interrupt. When such an interrupt is triggered, the DMA status registers may be updated before the interrupt is issued by the network interface unit 20.

The layer 2 header of incoming packets is parsed so that the packet is sent to the correct processing unit(s), depending on the address and filter configuration of each VMAC 260. In one embodiment, PFC 212 may be configured to parse the layer 2 header to determine if a processing unit 30 will accept the packet. For example, PFC 212 may parse the Ethernet Destination Address of the packet for the purposes of address matching, filtering, and multicast identification. In addition, the Type/Length must be parsed to determine the packet type. If the packet is a VLAN enabled frame, the VLAN ID is also extracted. In one implementation, PFC 212 may maintain four MAC address/filter pairs per processing unit 30 to determine whether a packet should be forwarded to each processing unit 30. In addition, PFC 212 may maintain a multicast hash table or the like, to filter out multicast packets, and a VLAN ID table to determine VLAN membership for the processing units 30.

Once the destination processing unit 30 has been determined, the packet header may be parsed for the L3/L4 fields, and a TCAM lookup key may be built using the destination processing unit ID and certain header fields, and the key sent to the TCAM 213 for classification. The results of the TCAM lookup are used to determine the specific DMA channel of a processing unit, or if the packet should be dropped. If no match is found, the packet is sent to a default DMA channel for that processing unit 30. In one implementation, packets may be spread to multiple DMA channels depending on the result of the TCAM classification. If traffic spreading is enabled for a particular TCAM entry, the source IP address and the destination L4 port, for example, may be hashed, and a number of the low order bits (e.g., lower 2 bits) may be used to index a DMA channel. The hashing algorithm may be implementation specific. In some embodiments, polynomial hashing may be used and based on a particular polynomial.

Figure 3:
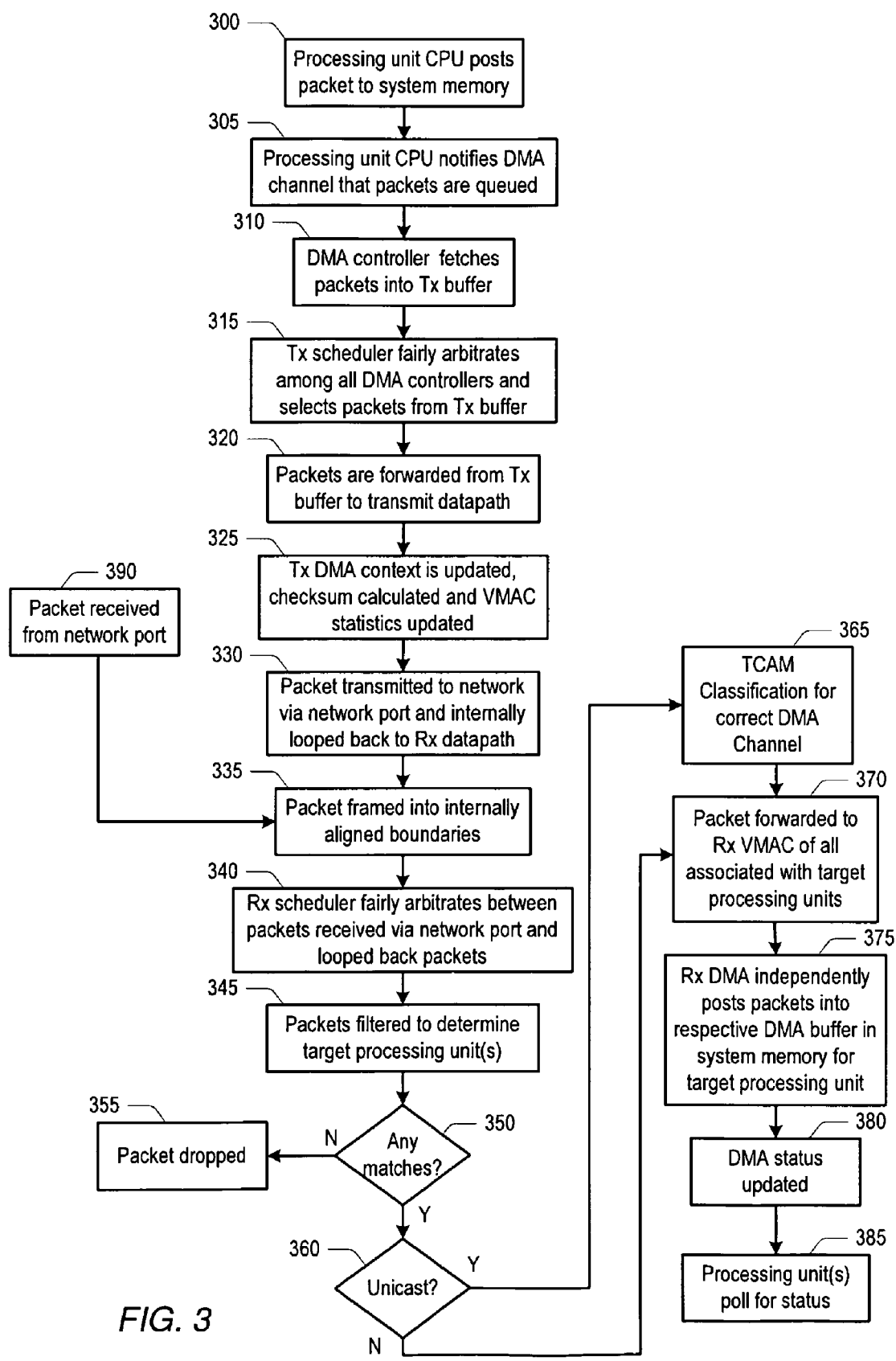
FIG. 3 is a flow diagram describing the operation of the network interface shown in FIG. 1 and FIG. 2.

In FIG. 3, a flow diagram describing the operation of a network interface unit 20 of FIG. 1 and FIG. 2 is shown. Referring collectively to FIG. 1 through FIG. 3, the packet flow through a single network interface 20 configured as an independent network interface is described. Beginning with block 300, a CPU of a given processing unit 30 sends one or more packets to locations in system memory (not shown) that have been allocated as DMA buffer space for that processing unit. The CPU may also notify, via the respective I/O interface 25, a particular TDMA channel 251 that there are packets to be transferred (block 305). Packet descriptors may be cached by the TDC 250 within a descriptor cache as described above. Based upon the descriptors, the TDC 250 may allocate space within reorder buffer, TBuf 253 and then fetch the waiting packet(s) from the DMA buffer(s) in system memory into TBuf 253 (block 310). In one embodiment, the TDC 250 may attempt to keep the TBuf 253 as full as possible. Once complete packets are queued in TBuf 253, the Tx arbitration and scheduler 214 arbitrates between the packets in the TBuf 253 of each of the processing unit resources 210. It is noted that the processing units 30 may concurrently send packets to system memory. Likewise, each of the DMA controller engines (e.g., TDC 250) may concurrently fetch packets from the system memory.

In one embodiment, the Tx arbitration and scheduler 214 may use a deficit round robin (DRR) arbitration scheme, in which the weighting of all processing units may be substantially equal. For example, in a fully loaded system with six processing units, each processing unit would have approximately 17% of the transmit bandwidth. However, if any of the processing units are idle on transmit, the active processing units may use the excess bandwidth to saturate the output port.

Packets are selected and sent from TBuf 253 (block 320) to the Tx datapath 210. Transmission is considered complete by the TDC 250 when the entire packet has been sent from the TBuf 253. The TDMA context is updated, the VMAC statistics are updated, the packets are stored in the store and forward buffer 216, and the checksum engine 215 generates a checksum (block 325). In one embodiment the checksum is a UDP/TCP checksum. As such, the checksum is computed for an entire packet and the checksum field is in the packet header. The entire packet is stored before transmission so that the header can be rewritten.

However, in other embodiments, the checksum engine 215 may perform a TCP/UDP checksum on a per packet basis. In such embodiments, the Tx datapath 209 may not process IP options, and therefore may not parse any IP source route options. Thus, it may not produce the correct pseudo-header for TCP/UDP checksum purposes because it does not know the final IP destination address. To solve this problem, software puts a partial checksum computed over the pseudo header in the checksum field, and the checksum engine 212 performs a checksum over the TCP/UDP payload without zeroing out the checksum field.

It is noted that in some embodiments, an internal header may be added to packets scheduled for transmission. The header may include information that indicates the checksum and CRC operations that are to be performed on the packet. However, this internal header may be stripped off by hardware before transmission.

The packets are now ready for transmission to the network 12. Accordingly, the Tx datapath 209 sends the packets to the Tx scheduler 204. Since the link 207 is not enabled, the Tx scheduler 204 forwards the packets to the Tx network MAC 205, which forwards the packets to the XAUI 206 for transmission to the network 12. In addition, as described above, the packets are forwarded to the Rx datapath 208 via the TX loopback path (block 330).

The receive datapath flow is described beginning in block 335. It is noted that the flow is the same as if packets are received via the network port 21 as shown in block 390. Accordingly, since the link 207 is disabled in this example, packets may only be received via the network via XAUI 201 and the TX loopback path, thus mux 202 is configured to always select the path coming from XAUI 201. When packets are received on the Rx datapath 208, the packets may be framed into internally aligned cycle boundaries at a specific width (block 335). The Rx arbitration and scheduler 211 fairly arbitrates between packets received via the TX loopback path and packets received via the network port 21 (block 340). Selected packets are filtered to determine the destination or target processing unit(s) (block 345). For example, the PFC unit 212 may be configured to compare the destination MAC address of the packet to the MAC addresses assigned to all processing units 30. In addition, the destination MAC address of the packet may be compared to multicast MAC addresses and VLAN group membership of each processing unit 30. As described above, one or more tables may store multicast address information as well as VLAN membership information.

If there are no matches to the destination MAC address, the packet may be dropped (block 355). However, if there are matches in the multicast table and the VLAN membership, the packet is forwarded to the RX VMAC 263 of all processing unit resources 210 that have matching MAC addresses (block 370). The Rx VMAC 263 statistics are updated. In one embodiment, the packet is sent to an RDMA channel 241 that has been programmed by the processing unit 30 as a default DMA channel for multicast packets. The Rx DMA channel 241 may store packets into the RBuf 243, and as packets are stored in RBuf 243, control logic within each of the RDC 240 may push packets into respective designated DMA buffers in system memory for the destination processing units (block 375). It is noted that software executing on the individual processing units may independently program their respective DMA control logic with the locations of the DMA buffers in system memory. The control logic within the RDC 240 may also update the descriptors and the DMA status (block 380). The processing unit software may poll the DMA status to know when a packet has been posted to system memory (block 285).

Referring back to block 360, if the packet is a unicast packet, then a TCAM classification is performed to determine to which DMA channel to send the packet. For example, if there is a TCAM match the packet is forwarded to the DMA channel indicated by the TCAM 213. However, if there is no match, the packet may be sent to the default DMA channel as described above in conjunction with block 370.

FIG. 4 through FIG. 8 illustrate various configurations of computer system 10 of FIG. 1 in which the network interface units 20A and 20B are used both independently and in cooperation with each other via the use of the link 55. More particularly, as described above, each network interface 20 may be used independently and include an independent network connection to the network 12. Alternatively, the two network interface units 20A and 20B may be used in cooperation with each other and share a single connection to the network 12. The cooperative configuration is facilitated by the use of the link 55. Accordingly, FIG. 4 through FIG. 8 depict more detailed aspects of portions of each network interface unit 20. In addition, connections shown as dashed lines indicate that that connection is either not connected or the line is disabled. It is noted that some portions of the network interface units are omitted for simplicity. For example, the internal pathways are shown from the transmit and receive datapaths out to the network port, while the remaining portions have been omitted.

Figure 4:
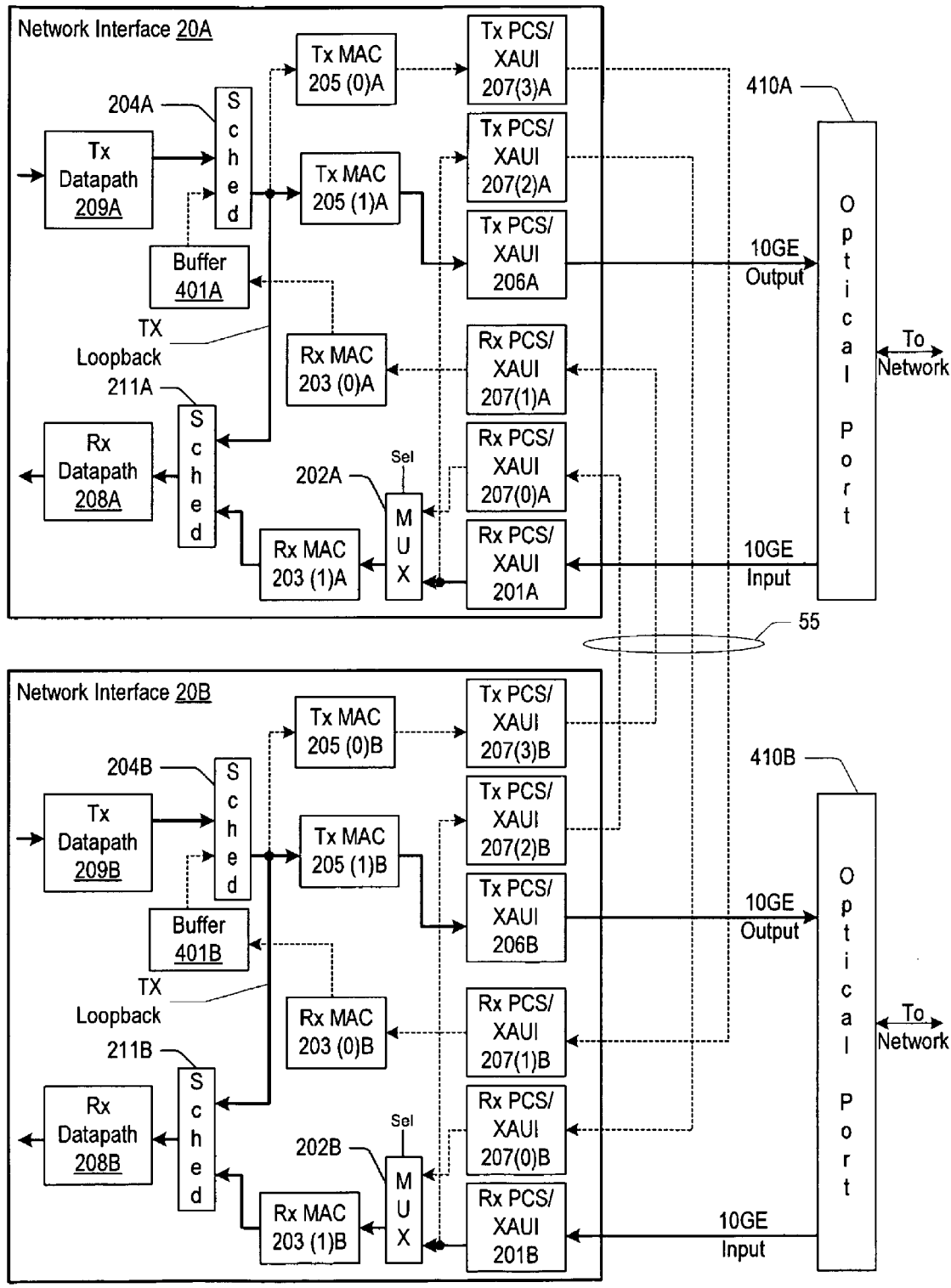
FIG. 4 is a block diagram of one embodiment of the computer system of FIG. 1 in which the network interface units are used in an independent configuration.

Turning to FIG. 4, a network interface 20A and a network interface 20B are shown connected in an independent configuration to a network (not shown) via respective optical ports 410A and 410B. In this configuration, each network interface has its respective network port 10GE output and input enabled and connected to the optical ports 410A and 410B. In addition, the inter link 55 is disabled as indicated by the dashed lines. As described above, in one embodiment, to configure a network interface 20, a maintenance or service processor may write to configuration registers within each network interface unit. The configuration register bits may control the operation of the network interface unit by, for example, enabling and disabling XAUI units, and selecting input and output paths through multiplexers.

In the illustrated embodiment, network interface units 20A includes a transmit datapath 209A that is coupled to a Tx scheduler 204A. The output of the scheduler 204A is coupled to Tx MAC units 205(0)A and Tx MAC units 205(1)A, and to one input of the Rx datapath scheduler 211A (this is the TX Loopback path of FIG. 2). The Tx MAC 205(0)A is coupled to Tx PCS/XAUI unit 207(3)A. However, as depicted by the dashed line, Tx MAC 205(0)A and Tx PCS/XAUI unit 207(3)A are disabled or not used in this configuration, since the interlink 55 is not used. Likewise for Tx PCS/XAUI unit 207(2)A. However, the Tx MAC unit 205(1)A is coupled to Tx PCS/XAUI 206A, which is coupled to the optical port 410A, which is in turn coupled to the network.

On the receive side, the optical port 410A is coupled to Rx PCS/XAUI 201A. The output of which is coupled to one input of the Rx Mux 202A and to Tx PCS/XAUI 207(2)A. The output of the Rx Mux 202A is coupled to Rx MAC 203(1)A, which is coupled to one input of the Rx datapath scheduler 211A. The select line of Rx mux 202A may be controlled by one or more bits in a configuration register such as configuration register 280 of FIG. 2, for example. The output of the Rx scheduler 211A is couple to the Rx datapath 208A. The remaining Rx PCS/XAUI units 207(0)A and 207(1)A are coupled to inter link 55 which is not in use. Accordingly the output from those units is shown as dashed lines. The output of Rx PCS/XAUI 207(0)A is shown coupled to the other input of Rx Mux 202A, while the output of Rx PCS/XAUI 207(1)A is coupled to Rx MAC 203(0)A. The output of the Rx MAC 203(0)A is coupled to buffer 401A. The buffer output is coupled to the other input of the Tx scheduler 204A. It is noted that in one embodiment, buffer 401A may be representative of a daisy chain buffer. It is also noted that although the various MAC units and PCS/XAUI units are shown as separate units, it is contemplated that in other embodiments the logic for the MAC units and the logic for the PCS/XAUI units may each be part of larger units, as desired.

As described above, in an independent configuration, the inter link 55 is not used. As such, the Tx PCS/XAUI units associated with interlink 55 are not used and may be disabled via configuration registers, for example. Similarly, the mux select may be configured to always select the input from Rx PCS/XAUI 201A. Accordingly, the transmit and receive paths are similar to that described in FIG. 2 and FIG. 3, in which transmitted packets from Tx datapath are sent to the network through scheduler 204A, Tx MAC 205(1)A, TX PCS/XAUI 206A, and optical port 410A. The transmitted packets are also sent to the Rx scheduler 211A via the Tx Loopback path. The packets received via optical port 410A, pass through Rx PCS/XAUI 201A, Rx MUX 202A, Rx MAC 203(1)A, Rx scheduler 211A and on to the Rx datapath 208A.

Since the internal components and the configuration of the pathways of the network interface 20B is virtually identical to the network interface unit 20A, a description of the operation of the receive and transmit paths for the network interface unit 20b is not described further.

Figure 5:
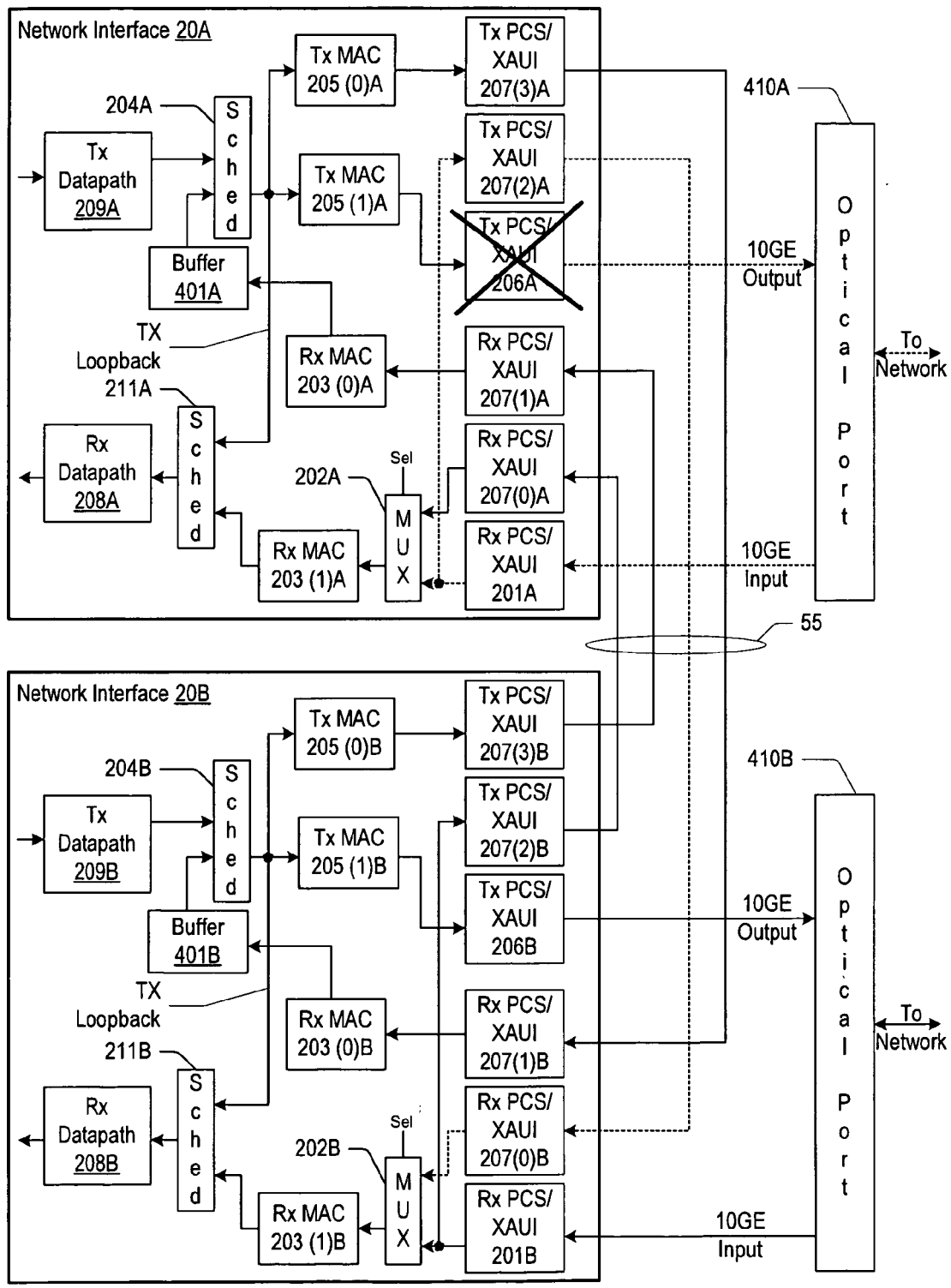
FIG. 5 is a block diagram of one embodiment of the computer system of FIG. 1 in which the network interface units are used in a cooperative configuration through a link.

Turning to FIG. 5, a network interface 20A and a network interface 20B are connected via a link 55 in a cooperative configuration to a network (not shown) via optical port 410B. In this configuration, the network interface 20B is the master interface and network interface 20A is a slave interface. As such, the network optical port 410B is shared by both network interfaces, and all packet traffic is passed to the network interface unit 20A through the network interface unit 20B and the link 55.

As described above, a service processor may independently configure each network interface unit 20 to operate in the cooperative configuration. Accordingly, as shown in FIG. 5, since the network port of the network interface unit 20A is not used, the Tx PCS/XAUI 206A may be disabled and the Rx PCS/XAUI 201A is not used. In this configuration, the mux select of Rx Mux 202A is configured to select the output of Rx PCS/XAUI 207(0)A. In addition, since the Rx PCS/XAUI 201A is not used, the Tx PCS/XAUI 207(2)A is also not used as indicated by the dashed lines.

Similarly, since the Tx PCS/XAUI 207(2)A of network interface unit 20A is not used, then the Rx PCS/XAUI 207(0)B is not used. Thus, the mux select of Rx Mux 202B is configured to select the output of Rx PCS/XAUI 201B.

Figure 6:
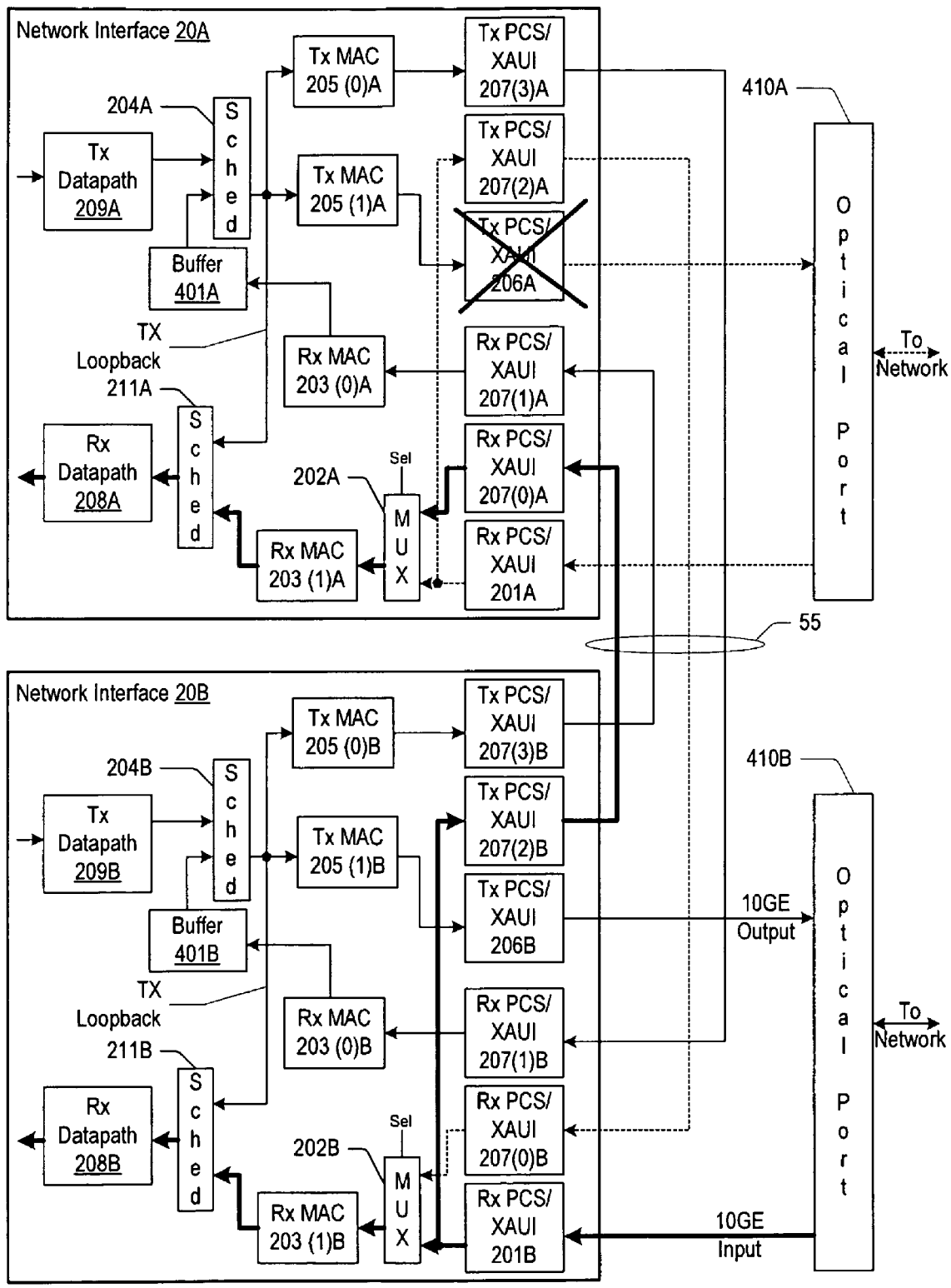
FIG. 6 is a block diagram of another embodiment of the computer system of FIG. 1 in which the network interface units are used in a cooperative configuration through a link.

Referring to FIG. 6, the receive pathway through two cooperatively configured network interface units is shown. In the illustrated embodiment, a network interface 20A and a network interface 20B are connected in a cooperative configuration to a network (not shown) via optical port 410B. Similar to the configuration shown in FIG. 5, the network interface units of FIG. 6 are also configured such that the network interface 20B is the master interface and network interface 20A is a slave interface. The receive path is indicated by thicker bold lines in FIG. 6.

Accordingly, when a packet is received via optical port 410B, it passes through PCS/XAUI 201B. The packet passes through Rx Mux 202B, Rx MAC 203(1)B to the Rx Scheduler 211B, and to the Rx datapath 208B. In addition, the packet is forwarded to Tx PCS/XAUI 207(2)B, which is part of the link interface 207 shown in FIG. 2. Since the Ethernet segment includes all blades, the packet must be seen by all filtering logic for each blade in the Rx datapath. Thus, the packet is then forwarded, via link 55, to Rx PCS/XAUI 207(0)A of network interface unit 20A. The packet passes through the Rx Mux 202A, the Rx MAC 203(1)A, the Rx Scheduler 211A, and on to the Rx datapath 208A. The Rx datapath 208A may then filter and classify the Packet as described above in conjunction with the description of FIG. 2 and FIG. 3.

Figure 7:
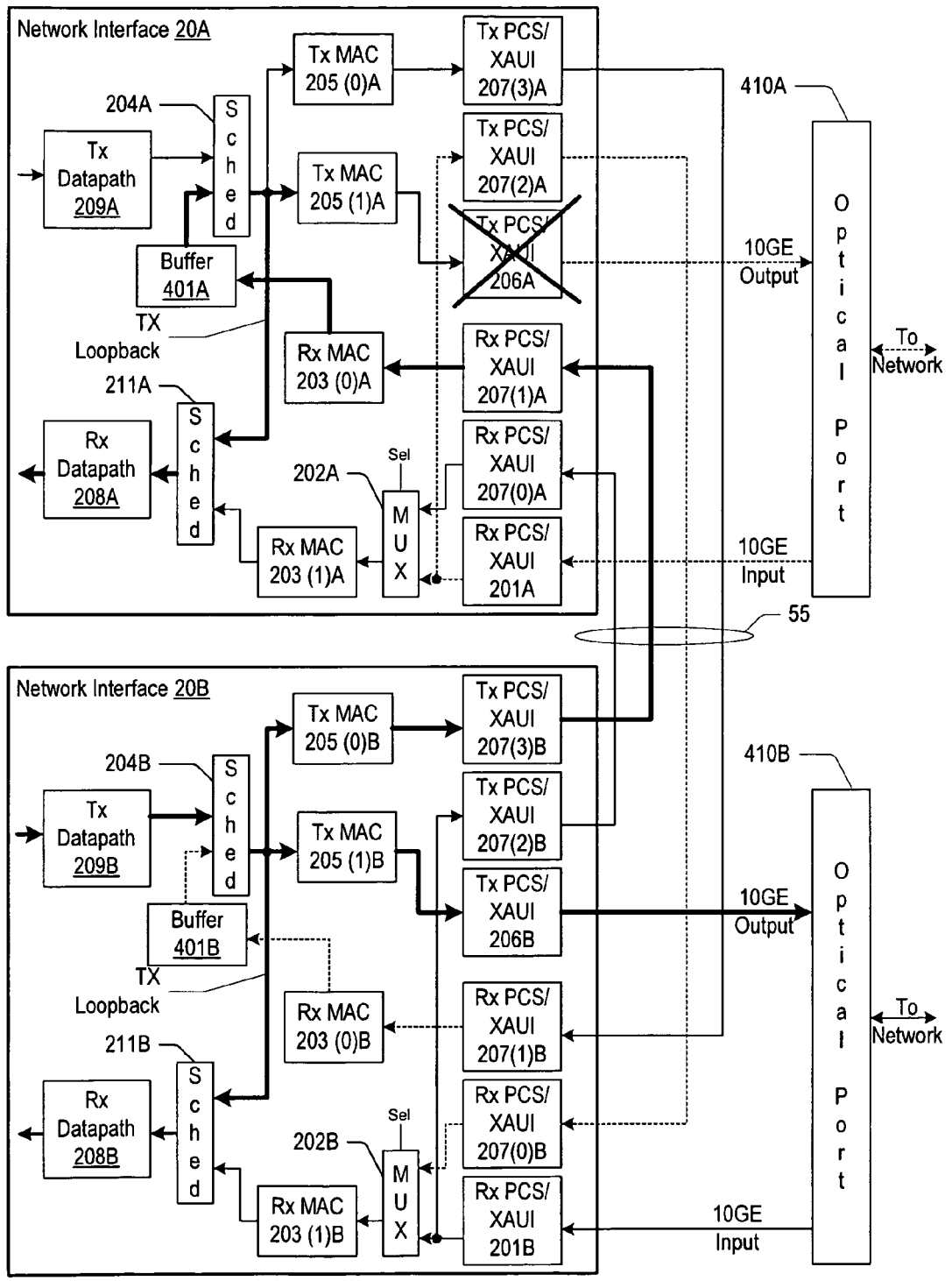
FIG. 7 is a block diagram of another embodiment of the computer system of FIG. 1 in which the network interface units are used in a cooperative configuration through a link.

Turning to FIG. 7, a transmit pathway originating in a master network interface unit is shown. In the illustrated embodiment, a network interface 20A and a network interface 20B are connected in a cooperative configuration to a network (not shown) via optical port 410B. Similar to the configuration shown in FIG. 5 and FIG. 6, the network interface units of FIG. 7 are also configured such that the network interface 20B is the master interface and network interface 20A is a slave interface. The transmit path is indicated by thicker bold lines in FIG. 7.

As shown, a packet forwarded by the Tx datapath 209B passes through to the Tx scheduler 204B to the Tx MAC 205(1)B, the Tx PCS/XAUI 206B and out to the optical port 410B for transmission on the network. In addition, the packet is forwarded via, the TX loopback to the Rx scheduler 211B and to the Rx datapath 208B. Further the packet is forwarded to the Tx PCS/XAUI 207(3)B and across the link 55 to Rx PCS/XAUI 207(1)A.

The received packet passes through the Rx MAC 203(0)A and into the buffer 401A. When the packet reaches the buffer head, it is then provided to the Tx scheduler 204A, and when selected, the packet is forwarded via the Tx Loopback path, to the Rx scheduler 211A and to the Rx datapath 208A. The Rx datapath 208A may then filter and classify the packet as described above in conjunction with the description of FIG. 2 and FIG. 3.

Figure 8:
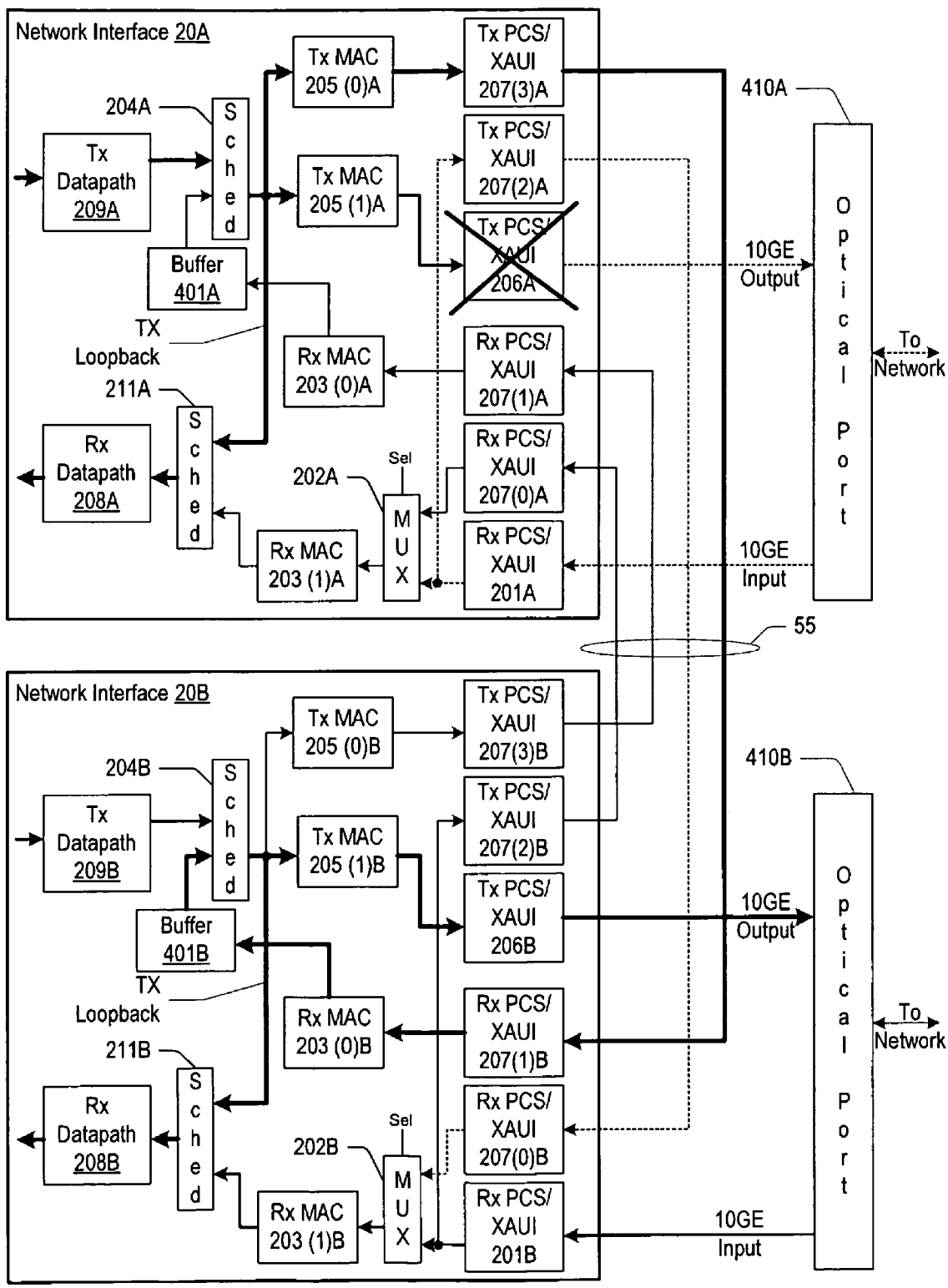
FIG. 8 is a block diagram of another embodiment of the computer system of FIG. 1 in which the network interface units are used in a cooperative configuration through a link.

Referring to FIG. 8, a transmit pathway originating in a slave network interface is shown. In the illustrated embodiment, a network interface 20A and a network interface 20B are connected in a cooperative configuration to a network (not shown) via optical port 410B. Similar to the configurations shown in FIG. 5 through FIG. 7, the network interface units of FIG. 8 are also configured such that the network interface 20B is the master interface and network interface 20A is a slave interface. The transmit path is indicated by thicker bold lines in FIG. 8.

As shown, a packet forwarded by the Tx datapath 209A passes through to the Tx scheduler 204A to the Tx MAC 205(0)A, the Tx PCS/XAUI 207(3)A and out the link 55. In addition, the packet is forwarded via, the TX Loopback to the Rx scheduler 211A and to the Rx datapath 208A, where the packet may be filtered and classified within the slave network interface unit 20A as described above in conjunction with the description of FIG. 2 and FIG. 3

The packet is received in the master network interface unit 20B at Rx PCS/XAUI 207(1)B. The received packet passes through the Rx MAC 203(0)B and into the buffer 401B. When the packet reaches the buffer head, it is then provided to the Tx scheduler 204B, and when selected, the packet is forwarded via the Tx Loopback path, to the Rx scheduler 211B and to the Rx datapath 208B, where the packet may be filtered and classified as described above in conjunction with the description of FIG. 2 and FIG. 3. In addition, the packet is forwarded to Tx PCS/XAUI 206B and out to the optical port 410B for transmission on the network.

As mentioned above, the ability of the network interface units 20 to share a network port via the link 55, and for each network interface unit 20 to act like a virtual Ethernet segment, may allow the computer system 10 to not only have a virtual segment that includes a larger number of processing units than in a single network interface unit system, but to also have a robust failover mechanism. More particularly, as described above the service processor may monitor system operations and detect failures. If a failure is detected in a network interface 20, the service processor may reconfigure the system dynamically, on the fly. As shown in FIG. 1, and FIG. 4 through 8, the link 55 and the network connection cabling may be in place and not used. In such embodiments, the various PCS/XAUI units may be enabled and disabled, the inputs to the RX mux may be selected, and the MAC units may be monitored and programmed as necessary by the service processor. Thus, by using the network interface units in a cooperative configuration through the link, if the service processor detects a failure in a master network interface unit, the service processor may reconfigure the system to use a slave network interface and its network port to communicate with the network.

Figure 9:
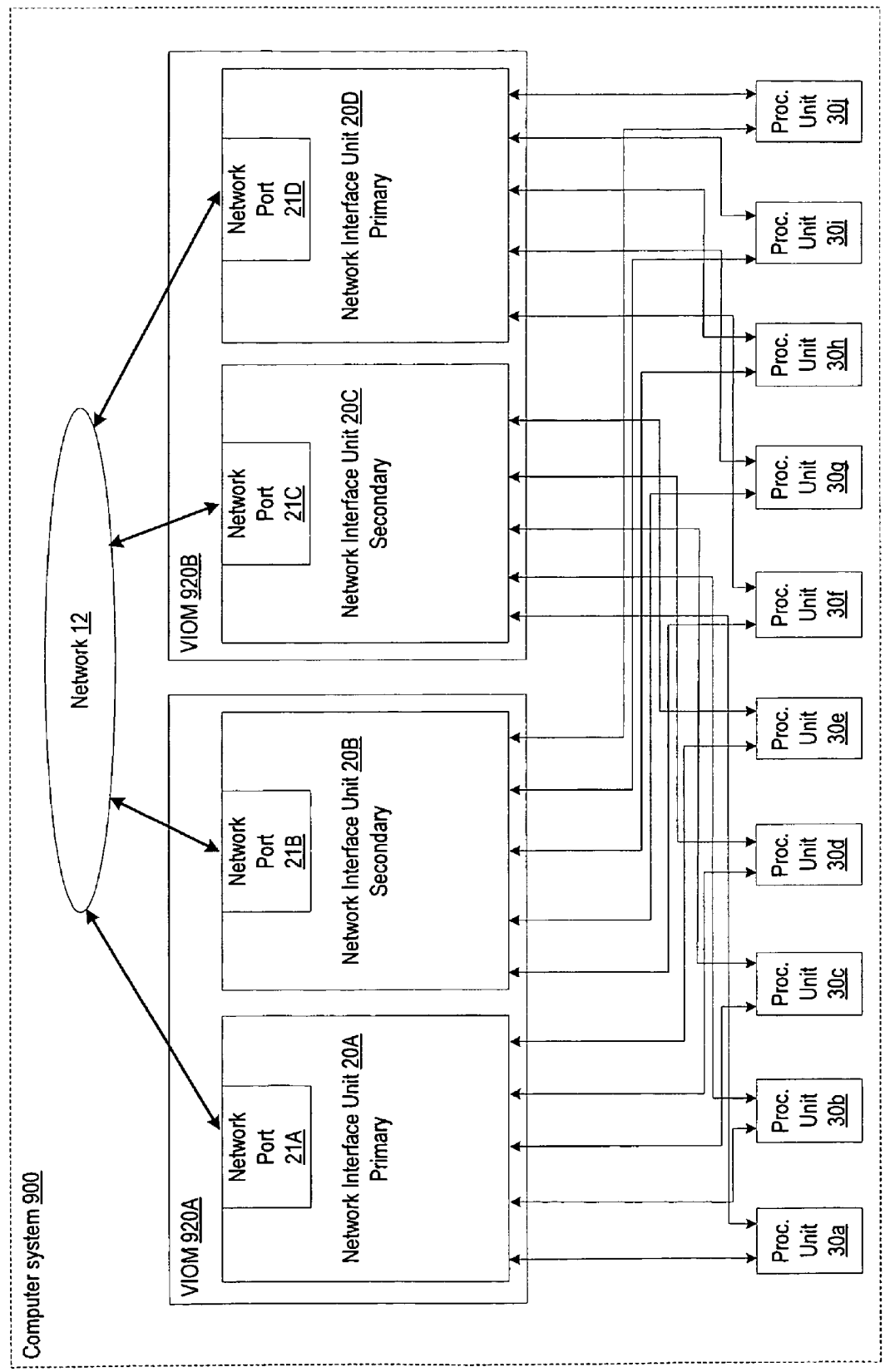
FIG. 9 is a block diagram of one embodiment of a computer system including network interface units connected in a redundant failover configuration.

Alternatively, a truly redundant backup may be used, in which two pairs of network interface units 20 may be used in a redundant configuration. In some embodiments, a blade chassis may be configured to have two network interface units 20 in a virtual I/O module (VIOM). In this scenario, the computer system 10 of FIG. 1 includes one VIOM. However, in one implementation a computer system may have redundant backup that includes two such VIOMs. In FIG. 9, a block diagram of computer system including two pairs of independently connected network interface units is shown.

Turning to FIG. 9, the computer system 900 includes two VIOMs, designated 920A and 920B, each including two network interface units 20, labeled 20A through 20D. In the illustrated embodiment, there are ten processing units, or blades, designated 30a though 30j. The network interface units 20 are all connected independently to the network 12. As shown, there is a primary and a secondary network interface unit in each VIOM. As such, the secondary network interface unit 20 of each VIOM may be in a standby mode, since each processing unit 30 is coupled to a primary network interface unit 20 of one VIOM and a secondary network interface unit 20 of the other VIOM.

As described above, in the event a failure of either primary network interface unit 20 is detected, the failover from one virtual NIC of one network interface unit 20 to another can be done without affecting other processing units because the network function that is shared among different blades does not participate in such a failover event. In one embodiment, the service processor may notify the affected processing units through their respective software mailboxes or through hardware such as the interrupt mechanisms described above. For example, if the 10GE uplink from network interface unit 20A is physically down, the service processor may notify the affected processing units, then the processing units 30a-30e may be configured to failover one at a time, to the secondary network interface unit 20C. In one embodiment, the processing units 30a-30e may simply borrow the MAC address from their respective virtual NICs within network interface unit 20A and append the MAC addresses to their associated virtual NICs within network interface unit 20C. However, it is noted that while a processing unit may "borrow" the MAC address from its virtual NIC and append it to the other virtual NIC that it owns, any card removal event from the VIOM with the borrowed MAC must cause software to disable using the borrowed MAC immediately since the processing unit no longer owns that virtual NIC and consequently, the associated MAC address.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a plurality of processing units;
    a first network interface unit coupled to a first portion of the plurality of processing units;
    a second network interface unit coupled to a different portion of the plurality of processing units; and
    a link coupled between the first network interface unit and the second network interface unit;
    wherein each of the first network interface unit and the second network interface unit includes:
        an independently controllable network port for connection to a network, wherein the network port includes:
            a shared media access control (MAC) unit;
            a link interface configured to convey packets to the link between the first network interface unit and the second network interface unit;
            control logic selectably configured to route packets between processing units belonging to the first portion of the plurality of processing units and the network via the network port of the second network interface unit and the link;
        a virtual interface coupled to the network port, wherein the virtual interface includes a plurality of independent programmable virtual MAC units, each associated with a respective processing unit, and programmably configured by the respective processing unit.

2. The system as recited in claim 1, wherein the control logic is further selectably configured to route packets between processing units belonging to the second portion of the plurality of processing units and the network via the network port of the first network interface unit and the link.

3. The system as recited in claim 1, wherein the virtual interface is further configured to distribute an available communication bandwidth of the network port among the processing units.

4. The system as recited in claim 1, wherein each of the first network interface unit and the second network interface unit includes a corresponding programmable configuration register that includes one or more bits that selectably control the routing of packets between the plurality of processing units and the network.

5. The system as recited in claim 4, wherein each programmable configuration register includes one or more bits configured to disable portions of the network port of the corresponding network interface unit.

6. The system as recited in claim 1, wherein the network port is configured to transmit and receive frame-based signals compatible with any of a plurality of Ethernet technologies.

7. The system as recited in claim 1, wherein each virtual interface further includes a plurality of processing unit resources, each associated with a respective processing unit, wherein each of the processing unit resources includes an I/O interface unit coupled to a respective processing unit via an I/O interconnect.

8. The system as recited in claim 7, wherein each of the I/O interface units includes an independently programmable configuration space that is configured by a respective processing unit to which it is connected.

9. The system as recited in claim 7, wherein each of the processing unit resources further includes, a receive direct memory access controller, a plurality of receive DMA channels, and a receive buffer, wherein each of the receive DMA channels is configured to independently and concurrently receive and store packets within the receive buffer, and wherein the receive DMA controller is further configured to push the packets stored in the receive buffer to storage locations allocated in a system memory.

10. The system as recited in claim 7, wherein each of the processing unit resources further includes a transmit DMA controller, a plurality of transmit DMA channels, and a transmit buffer, wherein each of the transmit DMA channels is configured to independently and concurrently fetch packets from additional storage locations allocated in the system memory and to store the packets in the transmit buffer for transmission on the network.

11. The system as recited in claim 1, wherein virtual interface units coupled via the link are configured as a network segment, and each virtual interface unit includes an internal loopback path, wherein a packet originating from a given processing unit and transmitted to the network via the network port of one of the first network interface unit or the second network interface unit is also sent via each internal loopback path to a receive datapath of each of the first network interface unit and the second network interface unit.

12. The system as recited in claim 1, further comprising a service processor coupled to the first network interface unit and the second network interface unit and configured to, in response to detecting a communication failure, disable portions of the network port of the second network interface unit, and to reconfigure the control logic to route packets between processing units belonging to the second portion of the plurality of processing units and the network via the link and the network port of the first network interface unit.

13. A network interface device for connection between a network and a plurality of processing units, the network interface device comprising:
  an independently controllable network port for connection to a network, wherein the network port includes:
    a shared media access control (MAC) unit;
    a link interface configured to convey packets to a link between the network interface device and a second network interface device; and
    control logic selectably configured to route packets between processing units belonging to a portion of the plurality of processing units coupled to the second network interface device and the network via the link and the network port; and
  a virtual interface coupled to the network port, wherein the virtual interface includes a plurality of independent programmable virtual MAC units, each associated with a respective processing unit, and programmably configured by the respective processing unit.

14. The device as recited in claim 13, wherein the control logic is further selectably configured to route packets between processing units coupled to the network interface device and the network via the link and a second network port of the second network interface device.

15. The device as recited in claim 13, wherein the virtual interface is further configured to distribute an available communication bandwidth of the network port among the plurality of processing units.

16. The device as recited in claim 13, further comprising a programmable configuration register that includes one or more bits that selectably control the routing of packets between the plurality of processing units and the network.

17. The device as recited in claim 16, wherein the programmable configuration register includes one or more bits configured to disable portions of the network port.

18. The device as recited in claim 13, wherein the network port is configured to transmit and receive frame-based signals compatible with any of a plurality of Ethernet technologies.

19. The device as recited in claim 13, wherein the virtual interface further includes a plurality of processing unit resources, each associated with a respective processing unit, wherein each of the processing unit resources includes an I/O interface unit coupled to a respective processing unit via an I/O interconnect.

20. The device as recited in claim 19, wherein each of the I/O interface units includes an independently programmable configuration space that is configured by a respective processing unit to which it is connected.

* * * * *